US009961626B2

(12) United States Patent
Fine et al.

(10) Patent No.: US 9,961,626 B2
(45) Date of Patent: May 1, 2018

(54) METHOD AND DEVICE FOR ACCESSING AN INTERNET PROTOCOL MULTIMEDIA SUBSYSTEM TYPE SUBSYSTEM

(71) Applicant: GEMALTO SA, Meudon (FR)

(72) Inventors: Jean-Yves Fine, Gemenos (FR); Julien Baudouin, Gemenos (FR)

(73) Assignee: GEMALTO SA, Meudon (FR)

(*) Notice: Subject to any disclaimer, the term of this patent is extended or adjusted under 35 U.S.C. 154(b) by 0 days. days.

(21) Appl. No.: 15/524,196

(22) PCT Filed: Oct. 21, 2015

(86) PCT No.: PCT/EP2015/074346
§ 371 (c)(1),
(2) Date: May 3, 2017

(87) PCT Pub. No.: WO2016/071110
PCT Pub. Date: May 12, 2016

(65) Prior Publication Data
US 2017/0339634 A1    Nov. 23, 2017

(30) Foreign Application Priority Data
Nov. 4, 2014    (EP) .................................... 14306766

(51) Int. Cl.
*H04W 4/00*    (2018.01)
*H04W 48/18*    (2009.01)
(Continued)

(52) U.S. Cl.
CPC ......... *H04W 48/18* (2013.01); *H04L 61/2007* (2013.01); *H04L 65/1016* (2013.01);
(Continued)

(58) Field of Classification Search
CPC ......... H04W 48/18; H04W 8/18; H04W 8/08; H04W 64/00; H04W 80/10; H04W 12/06;
(Continued)

(56) References Cited

U.S. PATENT DOCUMENTS

| 9,749,857 B2 * | 8/2017 | Hu ........................ H04W 12/06 |
| 2010/0050234 A1 | 2/2010 | Lindholm et al. |
| 2010/0290403 A1 * | 11/2010 | Lindholm ............... H04W 8/06 370/328 |

FOREIGN PATENT DOCUMENTS

WO    WO 2008/040389 A1    4/2008

OTHER PUBLICATIONS

International Search Report (PCT/ISA/210) dated Feb. 12, 2016, by the European Patent Office as the International Searching Authority for International Application No. PCT/EP2015/074346.
(Continued)

*Primary Examiner* — Amancio Gonzalez
(74) *Attorney, Agent, or Firm* — Buchanan Ingersoll & Rooney PC

(57) ABSTRACT

The invention relates to a method for accessing an Internet protocol Multimedia Subsystem type subsystem, said subsystem. According to the invention, a device is firstly connected to a mobile communication network, as a visited network, said first network. The method comprises the following steps. The first network sends to the device a first message comprising current location data relating to a location where the device is currently present. The device analyzes whether at least one roaming rule associated with the current location data is or is not stored within the device. The at least one roaming rule includes, each, at least one parameter for accessing the subsystem. And if the device does store the at least one roaming rule associated with the current location data, then the device sends to the subsystem
(Continued)

a second message including a request for connecting to the subsystem. The invention also pertains to a corresponding device.

10 Claims, 1 Drawing Sheet

(51) Int. Cl.
H04W 84/00 (2009.01)
H04W 8/08 (2009.01)
H04W 8/18 (2009.01)
H04L 29/06 (2006.01)
H04L 29/12 (2006.01)
H04W 80/10 (2009.01)
H04W 12/06 (2009.01)

(52) U.S. Cl.
CPC ............... H04W 8/08 (2013.01); H04W 8/18 (2013.01); H04W 84/00 (2013.01); H04L 61/6004 (2013.01); H04W 12/06 (2013.01); H04W 80/10 (2013.01)

(58) Field of Classification Search
CPC ............. H04L 65/1016; H04L 61/2007; H04L 61/6004
USPC ...................................................... 455/432.1
See application file for complete search history.

(56) References Cited

OTHER PUBLICATIONS

Written Opinion (PCT/ISA/237) dated Feb. 12, 2016, by the European Patent Office as the International Searching Authority for International Application No. PCT/EP2015/074346.

Nokia Siemens Networks: "IMS registration control", 3GPP Draft; S2-131180_Regcon_Disc_Decission, $3^{rd}$ Generation Partnership Project (3GPP), Mobile Competence Centre; 650, Route Des Lucioles; F-06921 Sophia-Antipolis Cedex, France; Apr. 2, 2013, XP050708387, retrieved from the Internet: http://www.3gpp.org/ftp/tsg_sa/WG2_Arch/TSGS2_96_San_Diego/Docs/ (retrieved on Apr. 2, 2013).

* cited by examiner

METHOD AND DEVICE FOR ACCESSING AN INTERNET PROTOCOL MULTIMEDIA SUBSYSTEM TYPE SUBSYSTEM

FIELD OF THE INVENTION

The invention relates generally to a method for accessing an Internet protocol Multimedia Subsystem (or IMS) type subsystem.

Furthermore, the invention also pertains to a device for accessing an IMS type subsystem.

STATE OF THE ART

As known per se, an IMS is an Internet Protocol (or IP) subsystem. The IMS is connected to an access (mobile radio-communication) network. The IMS allows combining dynamically IMS services, like e.g. Voice over IP (or VoIP), Rich Communication Services (or RCS), on-line gaming, during a communication session, like e.g. a phone call session. The IMS uses a Session Initiation Protocol (or SIP) to establish and control a communication session between user terminals or between a user terminal and an Application Server (or AS). The SIP enables a caller to establish a call session with a called person by using packet switching even though the caller does not know, prior to initiating a call, a current IP address of the called person.

Such a known solution implies, in a roaming context, in which a mobile (tele)phone, as a user terminal, comes into or is within a radio-coverage of a visited network to use the IMS.

However, there may not exist any IMS that is connected to the visited network. Moreover, when there exists an IMS, it is not mandatorily an IMS which satisfies a roaming rule(s) relating to a home network operator.

Thus, there is a need to access from a mobile phone to an IMS while satisfying the home network operator roaming rule(s) and a mobile phone user.

SUMMARY OF THE INVENTION

The invention proposes a solution for satisfying the just hereinabove specified need by providing a method for accessing an IMS type subsystem.

According to the invention, a device is firstly connected to a mobile communication network, as a visited network, said first network. The method comprises the following steps. The first network sends to the device a first message comprising current location data relating to a location where the device is currently present. The device analyses whether at least one roaming rule associated with the current location data is or is not stored within the device. The at least one roaming rule includes, each, at least one parameter for accessing the subsystem. And if the device does store the at least one roaming rule associated with the current location data, then the device sends to the subsystem a second message including a request for connecting to the subsystem.

The principle of the invention consists in that a device that is connected to a visited network, surveys its current location, compares it to each predefined location that is associated with an on-board roaming rule(s) comprising a parameter(s) for accessing an (IMS type) subsystem, and, when successful, sends to the subsystem a connection request.

Thus, based on a device location, the device is at an initiative or a root of a triggering of a mechanism to access the subsystem.

The device forbids access to any subsystem that is not previously registered as authorized by a home network operator that manages a device subscriber.

The device is forced to access a subsystem that is predefined by the concerned home network operator.

The invention method may be automatically implemented by involving the device that accesses one or several registered parameters for accessing a subsystem with which the home network operator has a roaming agreement for the considered location.

The subsystem access parameter(s) is(are) preferably recorded, in a secure manner, within a (hardware) token or a Secure Element (or SE) that protects access to stored data.

The subsystem access parameter(s) include(s) preferably data for authenticating to the subsystem, as data allowing a secure access to the concerned subsystem. Thanks to a selection of the subsystem access parameter(s) to be used by the device, the device is able to authenticate to the concerned subsystem.

Contrary to the herein above described known solution, the invention method allows accessing the subsystem while being under control of the device (and not of any first visited network).

Thus, a subscriber to a home network, as user of the device that implements the invention method, does not need to be involved at all.

Such an invention method may be thus transparent to the device user.

The invention method is therefore convenient for the subscriber to a concerned home network.

According to an additional aspect, the invention is a device for accessing an IMS type subsystem.

According to the invention, the device is firstly connected to a mobile communication network, as a visited network, said first network. The device is configured to:
  receive a first message comprising current location data relating to a location where the device is currently present;
  analyse whether at least one roaming rule associated with the current location data is or is not stored within the device, the at least one roaming rule including, each, at least one parameter for accessing the subsystem; and
  send, if the device does store the at least one roaming rule associated with the current location data, to the subsystem a second message including a request for connecting to the subsystem.

As device, it may include a terminal, a user terminal or an SE (or token).

Within the present description, an SE (or a token) is a smart object that, on the one hand, protects, as a tamper resistant component, physically access to data that the smart object stores and, on the other hand, is intended to communicate with the outside world.

As SE, it may be constituted by e.g. a Subscriber Identity Module (or SIM) type smart card, a Universal Integrated Circuit Card (or UICC), a smart Universal Serial Bus (or USB) type dongle, a mass-storage card, like an MMC (acronym for "MultiMediaCard"), an SD (acronym for "Secure Digital") type card and/or any other electronic medium that may have different form factors. According to still other examples, the SE is a chip to be either fixed, possibly in a removable manner, to a host computer, or soldered within a host computer, as a terminal or a user terminal.

BRIEF DESCRIPTION OF THE DRAWINGS

Additional features and advantages of the invention will appear after reading a detailed description of one preferred embodiment of the invention, given as one indicative and non-limitative example, in conjunction with the following drawings.

DETAILED DESCRIPTION

Herein under is considered a mobile equipment assembly comprising a mobile phone, as a UE and user terminal, and a UICC, as an SE and device for accessing an IMS type subsystem.

Instead of being constituted by a smart card, the SE may be constituted by an embedded chip, a SIM type card or a dongle of the USB type. The embedded chip is soldered, possibly in a removable manner, on a Printed Circuit Board (or PCB) of a terminal, as an SE hosting device.

According to another embodiment (not represented), the invention method for accessing an IMS type subsystem may be implemented, at the client side, by a mobile phone or terminal, as a stand-alone device. In other words, the device does not interact with any entity, like e.g. an SE, so as to access an IMS type subsystem. According to such an embodiment, the device is adapted to carry out functions that are carried out by the SE and that are described infra.

Naturally, the herein below described embodiment is only for exemplifying purposes and is not considered to reduce the scope of the present invention.

Figure 1:
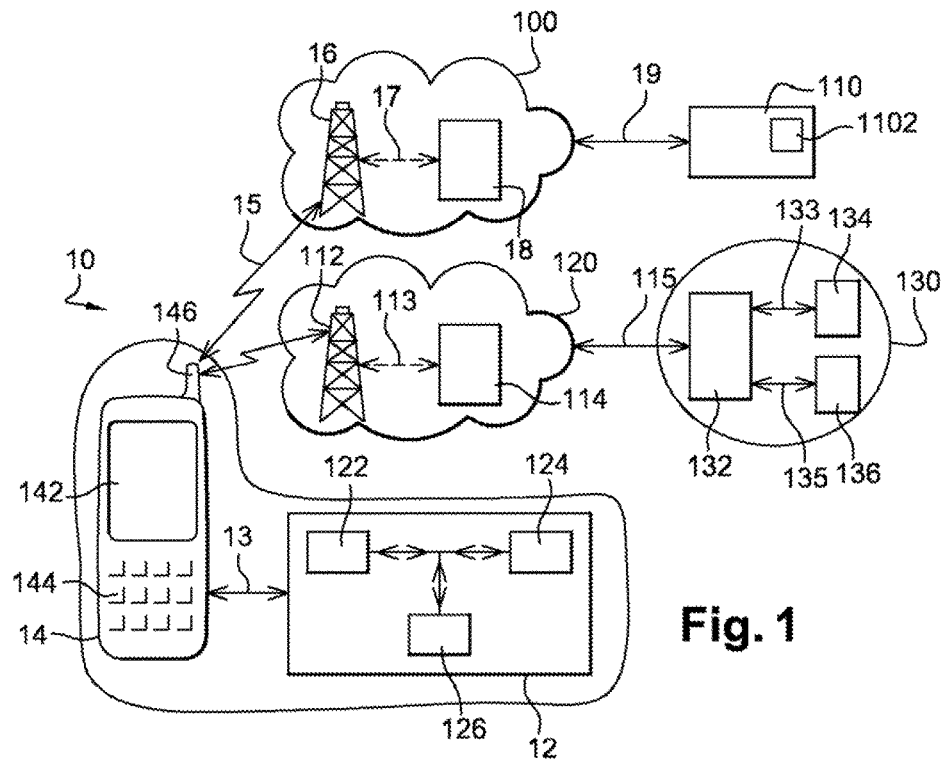
FIG. 1 illustrates a simplified diagram of one exemplary embodiment of a system for accessing an IMS, the system including a (mobile equipment) assembly and a server accessible through a visited network, the system being adapted to provide, based on the assembly location, a User Equipment (or UE), either from or through a cooperating SE, with a parameter(s) for accessing an IMS, according to the invention.

FIG. 1 shows schematically a system 10 for accessing an IMS 130 (or the like).

The system 10 includes a UICC 12, as an SE, a (mobile) phone 14, as a UE, and a back-end server 110, as a first server 110.

A (mobile equipment) assembly 11 includes the SE 12 and the UE 14 that is coupled to the SE 12.

The UE user desires to access one or several services accessible through an IMS, like e.g. a Voice over IP, as VoIP, and/or a RCS, such as an instant messaging.

The UE 14 is an IMS terminal.

The SE 12 belongs to the phone user, as a subscriber to a home (mobile radio-communication) network (not represented).

The home network includes a reference Home Location Register (or HLR) type entity.

The reference HLR (or the like, such as e.g. a Visited Location Register (or VLR)), manages a database. The reference HLR thus accesses information relating to the home network subscribers, as authorized users, that includes subscriber identifiers and associated home network authentication keys Ki among which there is the SE 12 credentials, as first credentials.

The reference HLR keeps track of a mobile user location when the UE 14 moves, i.e. keeps track of which Base Station Controller (or BSC) (not represented) and HLR type entity the phone user is being currently served.

The reference HLR includes a central database, like an AUthentication Center (or AUC) (not represented). The central database stores securely, i.e. in an encrypted manner, data, like the home network authentication keys and credentials, that allow authenticating the concerned subscriber to the home network. Amongst the network authentication keys, there is the network authentication key relating to a subscriber that are both stored within the SE 12/UE 14 which is authorized to access the home network.

The reference HLR, as an AUC, includes information that is required to carry out notably an authentication process relating to the concerned (home network) subscriber, like, among others, the SE subscriber and user. The reference HLR stores an authentication algorithm(s) (algo 1 . . . algo n) and an authentication key(s) (Ki1 . . . Kin), as a secret(s) shared with each subscriber, like e.g. the SE 12 user.

The home network is connected to an IMS (not represented) that includes a reference HSS (not represented). The reference HSS, as an AuC, includes information that is required to carry out notably an authentication process relating to the concerned (home network) subscriber, like the SE subscriber. The reference HSS stores an authentication algorithm(s) (algo 1 . . . algo n) and an authentication key(s) (Ki1 . . . Kin), as a secret(s) shared with each subscriber, like e.g. the SE 12 user. The authentication algorithm(s) may include a so-termed Milenage and possibly (an)other algorithm(s) that may each constitute a Milenage that is diversified.

The home network is operated by a home network operator, like e.g. a Mobile Network Operator (or MNO), a Mobile Virtual Network Operator (or MVNO), a service provider or on its behalf.

The UE 14 is located in a place, such as typically a cell, where the UE 14 is able to access a first (mobile radio-communication) network(s) 100, as a visited network. The visited network is distinct from the (subscriber) home network.

The UE 14 is firstly connected, over a bi-directional wireless link 16, to the first network 100.

The first network 100 uses a Long Range Radio-Frequency (or LR RF) type link(s) 15 to exchange with an external wireless communication device(s), like e.g. the UE 14.

The first network 100 may include one or several (mobile radio-communication) networks, like e.g. a Global System for Mobile communications (or GSM), a General Packet Radio Service (or GPRS), a Universal Mobile Telecommunications System (or UMTS), an EDGE (acronym for "Enhanced Data Rates for GSM Evolution"), a Code Division Multiple Access (or CDMA) and/or a Long Term Evolution (or LTE) type network(s).

Such a network set is not exhaustive but only for exemplifying purposes.

The LR RF(s) may be fixed at several hundreds of MHz, for instance, around 850, 900, 1800, 1900 and/or 2100 MHz.

The first network 100 includes a first Base Transceiver Station (or BTS) type entity 16 and a first Home Location Register (or HLR) type entity 18, like e.g. an HLR or an HSS, as AUC.

The first HLR type entity 18 is indirectly connected to the reference HLR (or the reference HSS), as AUC.

The first BTS 16 (or the like) constitutes a Network Access Point (or NAP) relating to the first network 100 with respect to any UE, like e.g. the UE 14, that is served by the first BTS type entity 16, as intermediary entity notably between the UE 14 and the first server 110.

The first network 100 comprises an entity, like e.g. a BSC that is connected to the first BTS 16, that has a capacity to provide data relating to a location in which a served wireless device, like e.g. the UE 14, is currently present.

The first network 100 may be connected to an IMS (not represented).

The UE 14 is also located in a place where the UE 14 is able to access a second (mobile radio-communication) network(s) 120.

The second network 120 may include one or several (mobile radio-communication) networks, like e.g. a GSM, a GPRS, a UMTS, an EDGE, a COMA, and/or an LTE type network(s).

Such a network set is not exhaustive but only for exemplifying purposes.

The second network 120 uses an LR RF type link(s) to exchange with an external wireless communication device(s), such as the UE 14.

Alternatively, instead of an LR RF type link(s), the second network 120 uses a Short Range (or SR) RF link(s) to exchange with an external wireless communication device(s), such as the UE 14. The SR RF link(s) include(s) one or several link(s), like e.g. Bluetooth, Wifi, Zigbee, an Near Field Communication (or NFC) type link(s). The second network 120 may include a WLAN (acronym for "Wireless Local Area Network") or an Internet or Intranet type network. The second network 120 includes one or several NAPs, like e.g. a Wifi hotspot.

The second network 120 includes a second BTS type entity 112, as a NAP, and a second HLR type entity 114.

The second HLR type entity 114 is indirectly connected to the reference HLR.

The second network 120 is connected, through a bi-directional link 115, to an IMS 130 (or several IMSs), as a subsystem(s).

The IMS 130 includes a Proxy-Call Session Control Function (or P-CSCF) 132, as a proxy server, a Home Subscriber Server (or HSS) 134 and a Short. Message Service Center (or SMS-C).

For the sake of clarity and conciseness, the first BTS type entity 16, the first HLR type entity 18, the second BTS type entity 112, the second HLR type entity 114 and the P-CSCF 132 are termed hereinafter the BTS 1 16, the HLR 1 18, the BTS 2 112, the HLR 2 114 and the second server 132 respectively.

The IMS 130 includes an IMS Core Network that allows accessing one or several services. The service(s) is(are) provided by one (or several) AS(s) that is(are) included within an application layer (not represented).

The second server 132 is a SIP proxy that is the first point of contact for an IMS terminal. The second server 132 is a mandatory intermediary for all the signalling. The second server 132 provides a subscriber authentication function.

The HSS 134 is connected, through a first bi-directional wire link 133, to the second server 132.

The HSS 134 is indirectly connected to the reference HSS.

The SMS-C 136 is connected, through a second bi-directional wire link 135, to the second server 132.

The UE 14 is sufficiently close to the BTS 2 112, as a second network 120 NAP, where the UE 14 is (currently) present, so as to communicate with each other.

Only one BTS 2 112 is represented. However, a plurality of BTSs may, each, cover, through an associated RF link(s), one or several wireless devices, such as the UE 14.

Only one UE 14 is represented for clarity reason. However, a plurality of UEs may, each, be covered by the second network 120.

The UE 14 includes, as Man Machine Interface (or MMI), a display screen 142 and a keyboard 144.

Instead of a phone, the SE hosting device may be, for instance, a laptop computer, a Personal Computer (or PC), a tablet computer, a media-player, a game console, a netbook, a handset, a Personal Digital Assistance (or PDA), any other portable device or other device that accesses, through one or two RF interfaces, the first network 100 and the second network 120.

Instead of a user terminal, it may be a terminal, like e.g. a vehicle, that does not include any MMI that allows interacting with a user, or any other device including means for processing data, comprising or being connected to at least one I/O interface with an SE, comprising or being connected to at least one wireless I/O interface with the first 100 and second 120 networks, as communication means for exchanging data with outside, and comprising or being connected to means for storing data.

Such an SE hosting device list is not exhaustive but only for exemplifying purposes.

The UE 14 comprises a first antenna 146. The first antenna 146 allows communicating data, through an LR RF link(s) 15, over the first network 100, with the OTA server 110 and, through an LR RF link(s) 111, over the second network 120, the accessible IMS 130.

Alternatively, instead of the LR antenna 146, the UE 14 comprises a second antenna (not represented) that allows communicating data, via an SR RF link(s), through a locally accessible NAP (instead of a BTS like entity), with a WLAN, as a second network.

The UE 14 includes one or several (micro)processor(s) (not represented), as data processing means, one or several memory(ies) (not represented), as data storing means, and several Input/Output (or I/O) interfaces (not represented).

The UE memory stores an identifier relating to the UE 14, like e.g. an International Mobile Equipment Identity (or IMEI).

The UE 14 plays, in a preferential manner, a role of a modulator-demodulator (or modem), so as to exchange data, through the first network 100, notably between the SE 12 and the first server 110.

The UE 14 plays, in a preferential manner, a role of a modulator-demodulator (or modem), so as to exchange data, through the second network 120, notably between the SE 12 and the second server 132.

The UE 14 is firstly under a first network radio coverage.

The UE 14 is preferably able to interact with the SE 12, so as to access the IMS 130.

Alternately, instead of comprising (or being coupled to) the SE 12, the UE 14 stores, within its own memory (not represented), data stored within the SE 12 as described infra.

The UE 14 is connected, via a contact (or contact-less) bi-directional link 13, to the SE 12.

The SE 12, as client device and device for accessing an IMS, is preferably associated with or tied to the first server 110.

Alternately, the UE 14 is associated with or tied to the first server 110.

The first server 110 is connected, through a bi-directional wire link 19, to the first network 100.

The SE 12 belongs to the UE user, as a subscriber to a wireless service(s).

The SE 12 includes one (or several) microprocessor(s) 122, as data processing means, one (or several) memory(ies)

124, as data storing means, and one (or several) I/O interface(s) 126 that are internally all connected, through an internal bidirectional data bus 123, to each other.

The SE memory 124 stores a unique identifier relating to the SE 12, like e.g. an integrated Circuit Card Identifier (or ICCID).

The SE memory 124 stores a unique identifier relating to the first server 110, like e.g. a URI, an URL or an IP address, as first server identifier.

The SE I/O interface(s) 126 allow(s) communicating data from the chip components to the chip exterior and conversely.

The SE microprocessor(s) 122 process(es), control(s) and communicate(s) data with all the other components incorporated within the SE 12 and, through the I/O interface(s) 126, with the chip exterior.

The (or each) SE microprocessor 122 executes one or several applications.

The SE microprocessor 122 executes, in a preferred manner, one or several security applications.

The security applications include preferably a user authentication process to be used prior to accessing the SE memory 124. To authenticate the user, the user has to provide a Personal Identity Number (or PIN), biometric data and/or the like, as user reference and user authentication data that is securely stored within the SE memory 124.

The security applications include preferentially an encryption/decryption process to be used prior to sending data to outside/after receiving data from outside, so as to protect access to data managed by or through the SE 12. To encrypt data to be sent, the SE 12 uses an encryption key and an encryption algorithm that are both stored within the SE memory 124. To decrypt data to be received, the SE 12 may use a decryption key and a decryption algorithm that are both stored within the SE memory 124.

The security applications, like e.g. an Ip multimedia Services Identity Module (or ISIM), include an authentication process to be used for identifying and authenticating to the IMS 130. To authenticate to the IMS 130, the authentication process uses one or several parameters for authenticating to the IMS 130. The parameters for authenticating to the IMS 130 are preferably stored within the SE memory 124 (or a UE memory or a memory accessible locally from the UE).

The SE microprocessor 122 is preferably able to initiate actions, in order to interact directly with the outside world, in an independent manner of the SE hosting device. Such a capacity of interaction at an initiative of the SE 12 is also known as proactive capacity. The SE 12 plays thus a role of a master while the SE hosting device plays a role of a slave.

The SE 12 is thus able to send, at its own initiative, through the UE 14, to any device connected to the UE 14, data by using a proactive command for sending data to e.g. the first server 110. As data sent to the first server 110, there may be a request for getting one or several roaming rules, so as to access notably the IMS 130. Such a roaming rule loading request may be accompanied with data, like e.g. an information item(s) relating to a location of the SE 12 and the UE 14 and (an)other information item(s) that may be related to the SE 12 and/or the UE 14. The information item(s) may have been previously retrieved from the UE 14, the SE memory 124 and/or one (or several) entity(ies) of the first network 100. The SE location information, as location data relating to a location where the SE 12 (and the UE 14) is present, may be more or less precise. For instance, the SE location information may be LOCation Information (or LOCI), an identifier of a cell served by the BTS 1 16, a Global Positioning System (or GPS) type location, data relating to a current country under a radio-coverage relating to the first network 100 and/or the like.

The SE memory 124 stores data for accessing the home network, as provider of one or several wireless services.

The data for accessing the home network includes preferably:

a predetermined first International Mobile Subscriber Identity (or IMSI 1), as a subscriber identifier for accessing at least the home network;

a predetermined first key Ki1, as a predetermined home network authentication key, allowing to authenticate the concerned subscriber to at least the home network, as first credentials;

Milenage (or the like), as a predetermined first authentication algorithm, allowing to authenticate the concerned subscriber to at least the home network.

The data for accessing the home network are shared with the home network and more exactly with the reference HLR, as AUC.

The SE memory 124 stores, preferably within either an apples object or one or several Elementary Files (or EF), data relating to one or several wireless services.

An EF includes a list of one or several Public Land Mobile Networks (or PLMN(s)) that are preferred for the home network operator. Each preferred Operator PLMN (or OPLMN) of the list is associated with an IMS, a roaming rule and subscriber location data for a particular user profile. Each roaming rule comprises one or several parameters for accessing an IMS, like e.g. the IMS 130.

By default, i.e. after an issuance of the SE 12, the SE 12 may not store a roaming rule that is associated with the location data that matches the location in which the UE 14 is currently present. In such a case, the SE 12 is configured to request from the first server 110 to (down)load a corresponding roaming rule(s) that is(are) associated with the UE 14 current (specific) location.

After a possible loading from the first server 110, the SE 12 stores each roaming rule that includes the parameters for accessing the IMS 130 that are associated with the UE 14 current location.

The parameters for accessing the IMS 130 include preferably:

a predetermined IP type address relating to the second server 132, as a proxy server;

a predetermined IP type address relating to the SMS-C 136;

one predetermined Ip Multimedia Private Identity (or IMPI), as a private user identity;

one (or several) predetermined Ip Multimedia PUblic identity(ies) (or IMPU);

one (or several) predetermined key(s) for authenticating to the IMS 130;

a predetermined algorithm to authenticate to the IMS 130; and/or one (or several) information item(s) for diversifying the algorithm to authenticate to the IMS 130.

The key for authenticating to the IMS 130 may be the first key Ki1 or a second key Ki2 that is distinct from the first key Ki1.

The algorithm for authenticating to the IMS 130 may be Milenage or another algorithm that may be Milenage that is diversified by using the information item(s) for diversifying the algorithm for authenticating to the IMS 130.

Each preferred OPLMN is associated with, as subscriber location data, e.g. the Mobile Country Code (or MCC) and the Mobile Network Code (or MNC) of the concerned targeted network. The EF is an OPLMN EF.

Another EF is a LOCI EF. The LOCI EF includes Location Area Information (or LAI) and location update status information. The LOCI identifies a MCC, as a country served by the concerned visited network. The LOCI includes a Location Area (or LA) that may be tracked for a more precise SE location. The LA is comprised within one radio cell of the network. The LA is uniquely identified within the visited network by its Location Area Code (or LAC).

According to a particular embodiment of the invention method, the SE 12 is thus able to track the (current) location of the UE 14 which the SE 12 depends on.

When the SE 12 roams into e.g. an MCC that is distinct from a previous visited MCC, the SE memory 124 stores an updated LOCI including the current MCC, as current location data.

For instance, when roaming, i.e. when the SE 12 leaves one home (network) cell location, as a previous geographical place under a radio-coverage of the home network, and enters another visited (network 100) cell location, as a current geographical place under a radio-coverage relating to the first network 100, as visited network, the LAI within the LOCI EF is updated with the current SE location.

The LAI update launches an SE analysis whether one (or several) roaming rule(s) associated with the current location is or is not stored within the SE memory 124.

If no roaming rule associated with the current location is registered within the SE memory 124, then the SE 12 provides the first server 110 with the current SE location data to get the associated roaming rule(s).

Once a roaming rule(s) associated with the current location is(are) registered within the SE memory 124, the SE 12 forces the UE 14 to use the parameters for accessing the IMS 130.

The SE 12 may be thus dynamically configured to force the use of an identified roaming rule(s) that is(are) associated with the current UE 14 location. When the SE 12 detects a change of a serving network, the SE 12 is able to force the UE 14, after a possible loading of a corresponding roaming rule(s) from the first server 110, to use a corresponding identified roaming rule.

The SE 12 is thus able, preferably once authenticated to the second network 120 and then to the IMS 130, to get connected to the IMS 130.

There is no need of any SE user involvement to use the identified roaming rule, since a selection of the roaming rule associated with the current UE location Is implemented automatically.

The IMS 130 to be selected may therefore be decided by or through the SE 12, i.e. by the first server 110 that provides the SE 12 with the roaming rule associated with the specific (current) SE 12 location.

The first server 110 may push, at the same time, besides the roaming rule associated with the specific UE 14 location, a locally accessible NAP to be selected, like e.g. a particular Service Set Identification (or SSID) or a particular AP address.

The first server 110 may be a so-termed Over-The-Air (or OTA) or Over-The-Internet (or OTI) server 110.

The first server 110 may be operated by a mobile radio-communication network operator, a bank operator, a service provider and/or on its behalf.

The first server 110 is accessible through the first network 100.

The first server 110 is hosted by a computer.

According to a preferred embodiment, the first server 110 is hosted by or coupled to a Hardware Security Module (or HSM) (not represented) that stores, manages (digital) keys and provides a crypto-processing service(s) in a secure manner.

The first server 110 includes a microprocessor(s) (not represented), as data processing means.

The first server 110 includes a memory 1102, as data storing means.

Alternatively (not represented), instead of an internal memory, the first server 110 is connected to an external memory.

According to a particular embodiment, the server memory 1102 stores a roaming rule providing application that allows providing a client device, like e.g. the SE 12, with a roaming rule(s) that is (are) associated with a specific client device location that is to be provided to the first server 110. Such a roaming rule providing application is supported by the first server 110.

Alternatively (not represented), instead of a remote server, the first server 110 is embedded within an entity, like a terminal or a token, and is locally accessible, i.e. up to 10 m via an SR RF link, from the UE 14, as user terminal.

The first server 110 is configured to provide one or several roaming rules associated with the specific client device location that is provided to the first server 110.

The server memory 1102 stores a database.

The database is under control of the first server 110.

The first server 110 takes preferably into account one or several parameters for accessing a concerned subsystem.

Such subsystem access parameters allow the client device to preferably authenticate to the second network 120 and thus to get connected to the second network 120.

The first server 110 is arranged to retrieve, further to a query to the database, information that is associated with specific location information that is preferably received from the SE 12 and/or the UE 14.

The first server 110 is preferably able to encrypt/decrypt data to be exchanged with the client device, as first server interlocutor, by using an encryption/decryption key(s) shared with the first server interlocutor.

The first server 110 manages the database and may communicate to outside data relating to the database based on specific location data that is provided.

The database contains data that relates to a plurality of client devices including the SE 12 and possibly the associated UE 14.

The data of the database includes preferably, for each client device:
- one or several identifiers relating to the client device, as server interlocutor;
- one or several roaming rules; and
- one or several associated (specific) locations, like e.g. specific MCCs.

Each roaming rule includes one or several parameters for connecting an IMS that are associated with a specific location(s).

The parameters for accessing an IMS may further include an identifier relating to an authentication mechanism to be used for accessing the second network 120 that is associated with specific location information.

The first server 110 is able to receive from an identified client device data relating to a specific location.

The first server 110 is configured to determine whether the received data relating to a specific location is or is not associated with one or several corresponding roaming rules.

To determine the associated roaming rule(s), the first server 110 compares the received specific location to one or several registered specific locations.

Once one or several corresponding roaming rules have been identified as being associated with the received (specific) location, the first server 110 sends back the identified roaming rule(s). The addressee of the roaming rule(s) is thus able to connect to the concerned subsystem.

Figure 2:
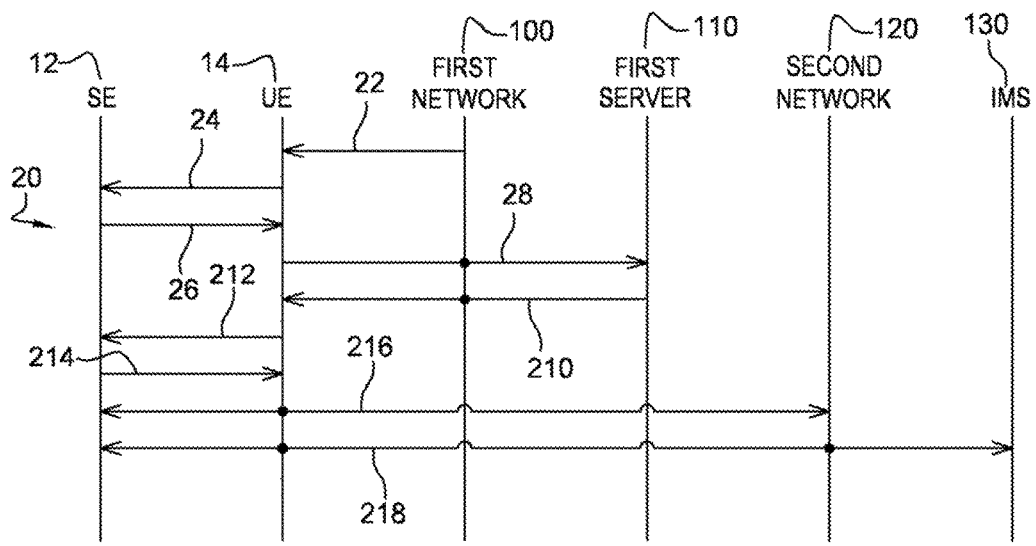
FIG. 2 represents an example of a flow of messages exchanged between the different entities of the system of FIG. 1, in which the SE pushes, dynamically, to the UE a parameter(s) for accessing an IMS, so as to force the UE to access the thus targeted IMS.

FIG. 2 depicts an example of a message flow 20 that involves notably the SE 12, the UE 14, the first network 100, as a firstly visited network, the first server 110 the second network 120 and the IMS 130.

It is assumed that a triggering event to access the IMS 130 is a change of a visited country by replacing LOCI 1 with MCC 1 relating to a home network by LOCI 2 with MCC 2 relating to a visited network that is surveyed and detected by the SE 12 further to a corresponding LOCI 2 provision.

At the UE 14 boot, preferably after a user authentication by the SE 12, the SE 12 authenticates (not represented) to the first network 100.

The UE 14 is firstly connected to the first network 100.

The SE 12 and the UE 14 may use Application Protocol Data Unit. The SE 12 and the UE 14 may use any other communication protocol, so as to exchange data.

The first network 100 (and more exactly the first BSC) sends to the UE 14 a message 22 including LOCI 2, as current LOCI, that comprises the MCC 2 relating to the visited first network 100, as data relating to a location where the UE 14 is currently present.

Optionally, the BTS 1 16 (or any other first network entity (not represented)) adds further triggering information, like e.g. a Quality of Service (or QoS) relating to a signal received from the UE 14 and/or any other radio parameter(s).

The UE 14 sends to the SE 12 a message 24 including the LOCI 2, as the current location data.

The SE 12 extracts the MCC 2, as the current country associated with the first network 100, from the LOCI 2.

The SE 12 detects that the UE 14/SE 12 changes from a home country to a visited country, as a country that is distinct from the home country.

The SE 12 analyses whether one (or several) roaming rule(s) associated with the MCC 2, as the current location data, is or is not stored within the SE 12.

It is assumed that the SE 12 does not store any roaming rule associated with the MCC 2 and therefore requests, through the UE 14, to the first server 110 a corresponding roaming rule.

Further to a failure to identify an on-board roaming rule associated with the MCC 2, the SE 12 gets the MCC 2, an ICCID, as an SE identifier, and optionally an IMEI, as a UE identifier.

Then, the SE 12 sends to the UE 14 a message 26 including a request for getting the corresponding roaming rule(s), the MCC 2, the SE identifier and optionally the UE identifier to be sent to the first server 110.

The UE 14 sends, through the first network 100, to the first server 110 a message 28, like e.g. a Short Message Service (or SMS) type message or an email, including a request for getting the corresponding roaming rule(s), the MCC 2, the SE identifier and optionally the UE identifier.

Then, the first server 110 identifies its interlocutor based on received identifier(s) relating to the SE 12 and queries the database to get a roaming rule(s) associated with the received MCC 2.

Optionally, the first server 110 encrypts the roaming rule(s) in association with the MCC2, as the current location data, prior to their sending in an encrypted manner.

Once retrieved by the first server 110, the first server 110 sends to the UE 14 a message 210, like e.g. an SMS type message or an email comprising, as request response, the roaming rule associated with the MCC 2.

Each roaming rule includes one or several parameters or connecting, through the second network 120, to the IMS 130.

These parameters for connecting to an IMS 130 include preferably:
- a predetermined IP type address relating to a proxy server 132;
- a predetermined IP type address relating to an SMS-C 136;
- one predetermined IMPI, as a private user identity;
- one (or several) predetermined IMPU(s);
- one (or several) predetermined key(s) for authenticating to the IMS;
- a predetermined authentication algorithm to authenticate to the IMS 130; and/or
- one (or several) information item(s) for diversifying an algorithm to authenticate to the IMS 130.

The UE 14 sends to the SE 12 a message 212 including the received roaming rule(s) associated with the MCC 2 that are possibly encrypted.

Optionally, the SE 12 decrypts encrypted data, so as to get the roaming rule(s) in association with the MCC2 in plain text.

The SE 12 updates its default settings by writing, within its memory 124, the received roaming rule(s), as a new user profile.

Once the SE 12 has updated its memory 124, the SE 12 sends to the UE 14 a message 214 including a request, like e.g. "Refresh", for getting the received roaming rule, so as to force the UE 14 to connect to the IMS 130.

Then, the UE 14 launches a network selection procedure by attempting to connect, through the second network 120, to the IMS 130.

The UE 14 authenticates 216 preferably to the (selected) second network 120 (more exactly the HLR 2 114, via an authentication vector, to the reference HLR) by using the received parameters for connecting, through the second network 120, to the IMS 130.

To authenticate to the second network 120, the UE 14 sends to the second network 120 the IMSI relating to the (home network) subscriber by reading the SE 12. The second network 120 sends to the SE 12 a random, as a challenge request. The SE 12 generates, based on the random, a stored and predetermined home network authentication key Ki1 and a stored and predetermined first authentication algorithm that are both shared with the reference HLR, a challenge response. The SE 12 sends to the second network 120 the challenge response. The reference HLR generates, based on the random, the predetermined home network authentication key Ki1 and the predetermined first authentication algorithm that are both shared with the SE 12, an expected result. The reference HLR checks whether the challenge response does or does not match the expected result. The reference HLR authenticates the SE 12 only if the challenge response matches the expected result. Otherwise, i.e. in case of no matching, the UE 14 is not authorized to access the second network 120 due to an authentication failure.

Once successfully authenticated to the second network 120, the UE 14 authenticates 218 preferably to the IMS 130

(more exactly the HSS 134, via an authentication vector, to the reference HSS) by using the received parameters for connecting to the IMS 130.

To authenticate to the IMS 130, the UE 14 sends to the IMS 130 the IMPI relating to the IMS (home network) subscriber by reading the SE 12. The IMS 130 sends to the SE 12 a random, as a challenge request. The SE 12 generates, based on the random, a stored and predetermined IMS authentication key Ki2 and a stored and predetermined second authentication algorithm that are both shared with the reference HSS, a challenge response. The SE 12 sends to the IMS 130 the challenge response. The reference HSS generates, based on the random, the predetermined IMS authentication key Ki2 and the predetermined second authentication algorithm that are both shared with the SE 12, an expected result. The reference HSS checks whether the challenge response does or does not match the expected result. The reference HSS authenticates successfully the SE 12 only if the challenge response matches the expected result. Otherwise, i.e. in case of no matching, the UE 14 is not authorized to access the IMS 130 due to an authentication failure.

Once authenticated to the IMS 130, the SE 12/UE 14 is connected to the IMS 130 and is thus able to access any service offered by the IMS 130.

Alternately, after the SE 12 analysis relating to an on-board presence of a roaming rule associated with the MCC 2, if the SE 12 does store the roaming rule associated with the MCC 2, as the current location data, then the SE 12 sends directly (i.e. without exchanging with the first server 110) to the UE 14 a message 214 including a request, like e.g. "Refresh", for getting the (available) roaming rule, so as to force the UE 14 to connect to the IMS 130.

Such an invention method for accessing a predefined IMS 130 under a control of the home network operator is transparent to the user since she/he has no credentials to provide to access the targeted IMS 130 (apart from a PIN and/or user authentication data to be provided to access the SE memory 124).

The invention method for accessing a predefined IMS 130 is automatic, easy and convenient for the user with a seamless user experience, irrespective of whether the first network 100 is or is not connected to an IMS.

The invention method for accessing a predefined IMS 130 also provides flexibility in a roaming agreement management over the time since the SE 12 configuration (or setting) still remains remotely possible.

The invention method for accessing a predefined IMS 130 allows accessing and offloading the first network 100. Access to the IMS 130 may further allow increasing a data rate, as QoS.

The proposed invention method for accessing a predefined IMS 130 is compatible with the existing network infrastructure and standardized technologies, like notably the 3GPP UICC file system, the 3GPP OTA messaging and the 3GPP network selection procedure.

A lot of amendments of the embodiment described supra may be brought without departing from the invention. For example, as another embodiment, instead of the SE 12, a user terminal, like e.g. the UE 14, as stand-alone entity, constitutes a device for accessing an IMS type subsystem that carries out, besides the functions carried out by the UE 14 as described supra, the functions that are carried out by the SE 12 as described supra.

The invention claimed is:

1. A method for accessing an Internet protocol Multimedia Subsystem type subsystem, as a subsystem, a device being firstly connected to a mobile communication network, as a visited network and a first network, comprising:
    the first network sends to the device a first message comprising current location data relating to a location where the device is currently present;
    the device analyses whether at least one roaming rule associated with the current location data is or is not stored within the device, each of the at least one roaming rule including at least one parameter for accessing the subsystem; and
    if the device stores the at least one roaming rule associated with the current location data, then the device sends to the subsystem a second message including a request for connecting to the subsystem.

2. Method according to claim 1, wherein, the device being coupled or connected to a secure element, the method further comprising the following steps:
    the device sends to the secure element a message comprising current location data relating to a location where the device is currently present;
    the secure element analyses whether at least one roaming rule associated with the current location data is or is not stored within the secure element, each of the at least one roaming rule including at least one parameter for accessing the subsystem;
    if the secure element does not store the at least one roaming rule associated with the current location data, then the secure element sends to the device a message comprising a request for getting the at least one roaming rule; and
    the secure element sends to the device a message including a request for connecting to the subsystem.

3. Method according to claim 2, wherein, if the secure element does not store the at least one roaming rule associated with the current location data, then the secure element sends to a server a message comprising a request for getting the at least one roaming rule, the associated current location data, at least one identifier relating to the secure element, and the first server sends to the secure element a message comprising, as a request response, the at least one roaming rule associated with the current location data.

4. Method according to claim 1, wherein, prior to sending to the device the message comprising current location data relating to a location where the device is currently present, the device authenticates to the first network.

5. Method according to claim 1, wherein, after having sent the message including a request for connecting to the subsystem, the subsystem being connected to a second network, the device authenticates to the second network.

6. Method according to claim 1, wherein, after having received the second message from the device, the device authenticates to the subsystem.

7. Method according to claim 1, wherein the current location data includes data relating a change of a geographical place from a previous geographical place under a radio-coverage relating to a home network to a current geographical place under a radio-coverage relating to the first network.

8. Method according to claim 1, wherein the at least one parameter for accessing the subsystem includes at least one element of a group comprising:
    a predetermined Internet Protocol type address relating to a proxy server;
    a predetermined Internet Protocol type address relating to a Short Message Service Center;
    one predetermined private user identity;
    at least one predetermined public user identity;

at least one predetermined key for authenticating to the subsystem;

a predetermined algorithm to authenticate to the subsystem;

at least one predetermined information item for diversifying the algorithm to authenticate to the subsystem.

9. Method according to claim 1, wherein the current location data includes data relating to a current country under a radio-coverage relating to the first network.

10. A device for accessing an Internet protocol Multimedia Subsystem type subsystem, as a subsystem, wherein, the device being firstly connected to a mobile communication network, as a visited network and a first network, the device is configured to:

receive a first message comprising current location data relating to a location where the device is currently present;

analyse whether at least one roaming rule associated with the current location data is or is not stored within the device, each of the at least one roaming rule including at least one parameter for accessing the subsystem; and send, if the device stores the at least one roaming rule associated with the current location data, to the subsystem a second message including a request for connecting to the subsystem.

* * * * *